United States Patent
Fujibayashi et al.

[11] Patent Number: 5,911,125
[45] Date of Patent: Jun. 8, 1999

[54] CNC ACCELERATION-DECELERATION CONTROL APPARATUS AND METHOD

[75] Inventors: Kentaro Fujibayashi, Musashino; Kunihiko Murakami, Hino, both of Japan

[73] Assignee: Fanuc, Ltd., Yamanashi, Japan

[21] Appl. No.: 08/817,413

[22] PCT Filed: Aug. 22, 1996

[86] PCT No.: PCT/JP96/02347

§ 371 Date: Apr. 16, 1997

§ 102(e) Date: Apr. 16, 1997

[87] PCT Pub. No.: WO97/08597

PCT Pub. Date: Mar. 6, 1997

[30] Foreign Application Priority Data

Aug. 23, 1995 [JP] Japan ................................ 7-214641

[51] Int. Cl.$^6$ .............. H02P 5/00; H02P 7/00; G05B 19/19
[52] U.S. Cl. ............. 702/141; 364/474.3; 364/474.28; 364/152; 364/166; 364/174; 318/567
[58] Field of Search ............... 364/566, 474.3, 364/474.01, 474.28, 474.24, 148, 152, 153, 166, 172, 173, 174, 176; 318/560, 567, 569, 568.1, 600; 395/80, 88, 95, 96

[56] References Cited

U.S. PATENT DOCUMENTS

| | | |
|---|---|---|
| 4,558,266 | 12/1985 | Sasaki et al. . |
| 4,684,865 | 8/1987 | Auger ........................ 318/696 |
| 4,715,491 | 12/1987 | Elderton ...................... 198/856 |
| 4,734,847 | 3/1988 | Hunter . |
| 4,757,457 | 7/1988 | Matsumoto ................... 364/474 |
| 4,894,594 | 1/1990 | Kawamura et al. ........... 318/567 |
| 4,994,978 | 2/1991 | Kawamura et al. ........... 364/474.3 |
| 5,004,968 | 4/1991 | Mizuno et al. ............... 318/615 |
| 5,155,424 | 10/1992 | Sasaki et al. ................. 318/569 |
| 5,194,793 | 3/1993 | Niimi ........................... 318/568.15 |
| 5,200,680 | 4/1993 | Sasaki et al. . |
| 5,221,884 | 6/1993 | Teshima ....................... 318/569 |
| 5,309,074 | 5/1994 | Mizukami ..................... 318/571 |
| 5,325,467 | 6/1994 | Torii et al. .................... 395/96 |
| 5,331,264 | 7/1994 | Cheng et al. ................. 318/568.11 |
| 5,371,452 | 12/1994 | Kato ............................. 318/610 |
| 5,373,439 | 12/1994 | Jeon ............................. 364/167.01 |
| 5,406,182 | 4/1995 | Iwashita ....................... 318/560 |
| 5,477,117 | 12/1995 | Saito ............................ 318/568.22 |
| 5,485,065 | 1/1996 | Kaneko et al. ............... 318/270 |
| 5,508,596 | 4/1996 | Olsen ........................... 318/567 |
| 5,521,830 | 5/1996 | Saito ............................ 364/474.34 |
| 5,528,506 | 6/1996 | Yoshida et al. .............. 364/474.3 |
| 5,552,688 | 9/1996 | Haga ............................ 318/569 |
| 5,675,496 | 10/1997 | Itoh .............................. 364/474.3 |
| 5,708,342 | 1/1998 | Nihei et al. .................. 318/558.18 |

FOREIGN PATENT DOCUMENTS

| | | |
|---|---|---|
| 0 299 080 | 1/1989 | European Pat. Off. . |
| 56-77904 | 6/1981 | Japan . |
| 4-217507 | 8/1992 | Japan . |
| 4-245307 | 9/1992 | Japan . |
| 6-337708 | 12/1994 | Japan . |
| 09-076318 | 9/1995 | Japan ............................. B29C 45/76 |

*Primary Examiner*—Patrick Assouad
*Attorney, Agent, or Firm*—Staas & Halsey

[57] ABSTRACT

Program storage means (1) is stored with a command program (1a) for driving and controlling a servomotor (4) that drives a belt conveyor (2). Acceleration-deceleration control means (7) detects the current position and current speed of the servomotor (4), and referring to the result of detection, executes acceleration-deceleration control in accordance with acceleration-deceleration points commanded by the command program (1a) and a time constant and target speed for each acceleration-deceleration point.

6 Claims, 5 Drawing Sheets

CNC ACCELERATION-DECELERATION CONTROL APPARATUS AND METHOD

This application is a Con. under 35 USC 371 of PCT/JP96/02347, filed Aug. 22, 1996.

FIELD OF THE INVENTION

The present invention relates to a CNC acceleration-deceleration control apparatus and method for controlling acceleration and deceleration of the operating speed of an industrial machine, such as the moving speed of a conveyor, by means of a CNC.

BACKGROUND OF THE RELATED ART

Conventionally, in controlling an industrial machine, such as a belt conveyor, by means of a CNC (numerical control device), control of a servomotor is executed in accordance with a command program that gives commands of a target position and a moving speed. In such a case, however, during the operation of the servomotor, the speed is not always constant, and acceleration or deceleration is effected as required. Conventionally, therefore, the timing for the acceleration or deceleration is commanded in accordance with points of contact at acceleration or deceleration point or by an operator's button operation. In such a conventional system,. on receiving this command, the CNC carries out acceleration or deceleration to a moving speed that is previously set in parameters.

According to the conventional system, however, the acceleration-deceleration control is controlled after receiving external signals from the points of contact, buttons, etc., so that there has been a problem of time lag in starting the control. Besides, the hardware must be set up according to the purpose, causing the operating procedure of the conventional system to become cumbersome and lacking in general-purpose applicability.

SUMMARY OF THE INVENTION

The object of the present invention is to provide a CNC acceleration-deceleration control system with excellent controllability, response and facility of setting.

In order to achieve the above object, a command program for driving and controlling a servomotor for driving an industrial machine, such as a belt conveyor, is loaded with at least one acceleration-deceleration to be starting positions in one block, a time constant for acceleration or deceleration to be started at each acceleration-deceleration starting position, and a target speed of the acceleration or deceleration. The servomotor is controlled in accordance with this command program, and acceleration-deceleration control is started according to an acceleration-deceleration time constant corresponding to one acceleration-deceleration starting position specified by the command program when it is detected that the current position of the servomotor has arrived at the acceleration-deceleration starting position. When the current speed of the servo motor has reached the target speed corresponding to the acceleration-deceleration starting position, the acceleration-deceleration control started at the acceleration-deceleration starting position is terminated.

According to the present invention, as described above, the acceleration-deceleration starting position and the degree of acceleration or deceleration can be commanded by the command program, so that the acceleration or deceleration in one block can be executed without previously setting parameters or points of contact. Thus, the operating efficiency can be improved. Furthermore, the timing for the start of the acceleration or deceleration, time constant, target speed, etc. can be changed with ease by rewriting the command program.

DESCRIPTION OF THE PREFERRED EMBODIMENTS

Figure 1:
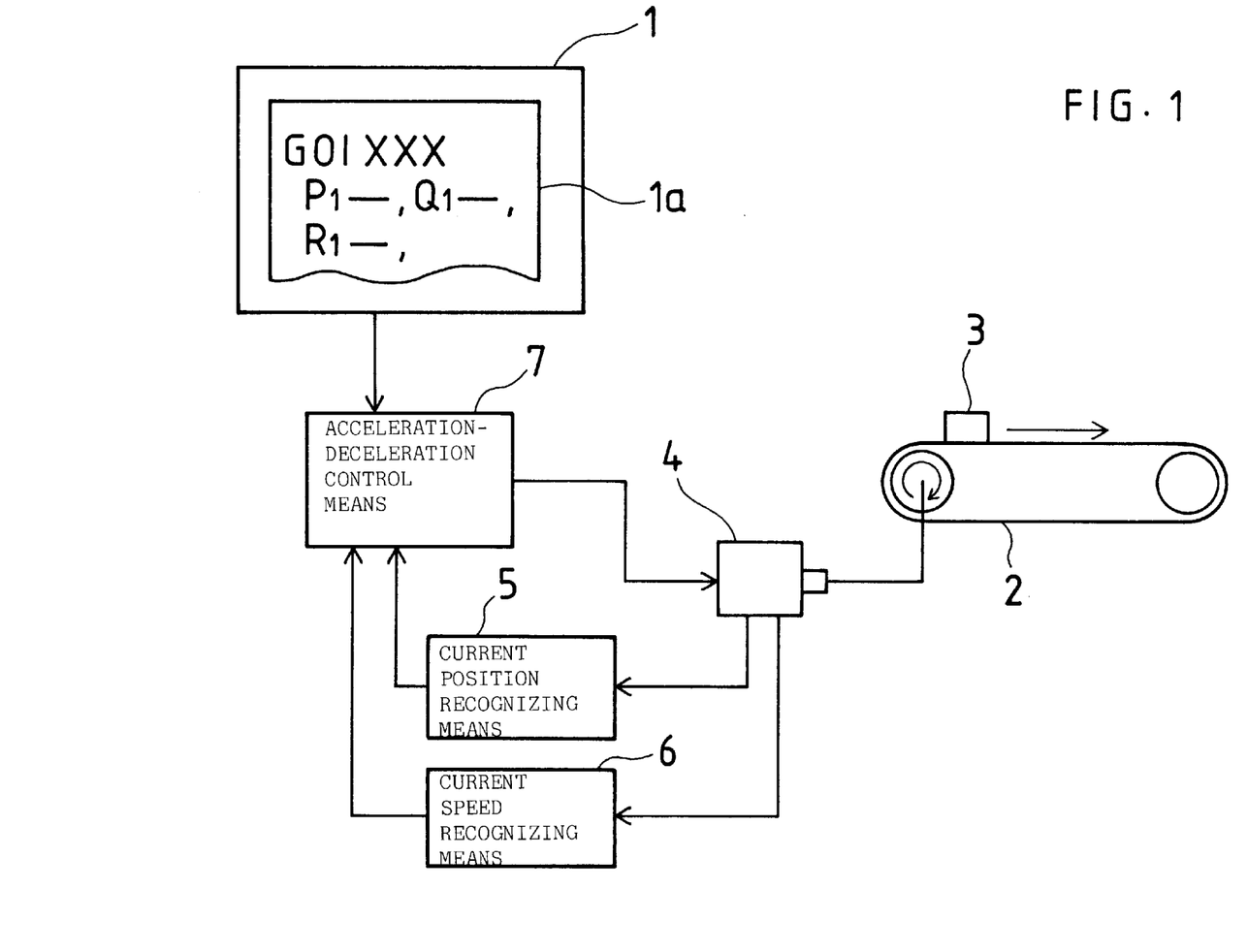
FIG. 1 is a block diagram illustrating the function of an acceleration-deceleration control apparatus according to the present invention.

Referring first to the block diagram of FIG. 1, an outline of acceleration-deceleration control according to the present invention will be described.

Program storage means 1 stores a command program 1a used in transporting a workpiece 3 by a belt conveyor 2 as an industrial machine. The belt conveyor 2 is driven by means a servomotor 4. Current position recognizing means 5 recognizes the current position of the servomotor 4, while current speed recognizing means 6 recognizes the current speed of the servomotor 4. Referring to the current position and current speed of the servomotor 4, acceleration-deceleration control means 7 executes acceleration-deceleration control in accordance with acceleration-deceleration points in one block commanded by the command program 1a and a time constant (time required from one speed to the next target speed) at each acceleration-deceleration point.

Figure 2:
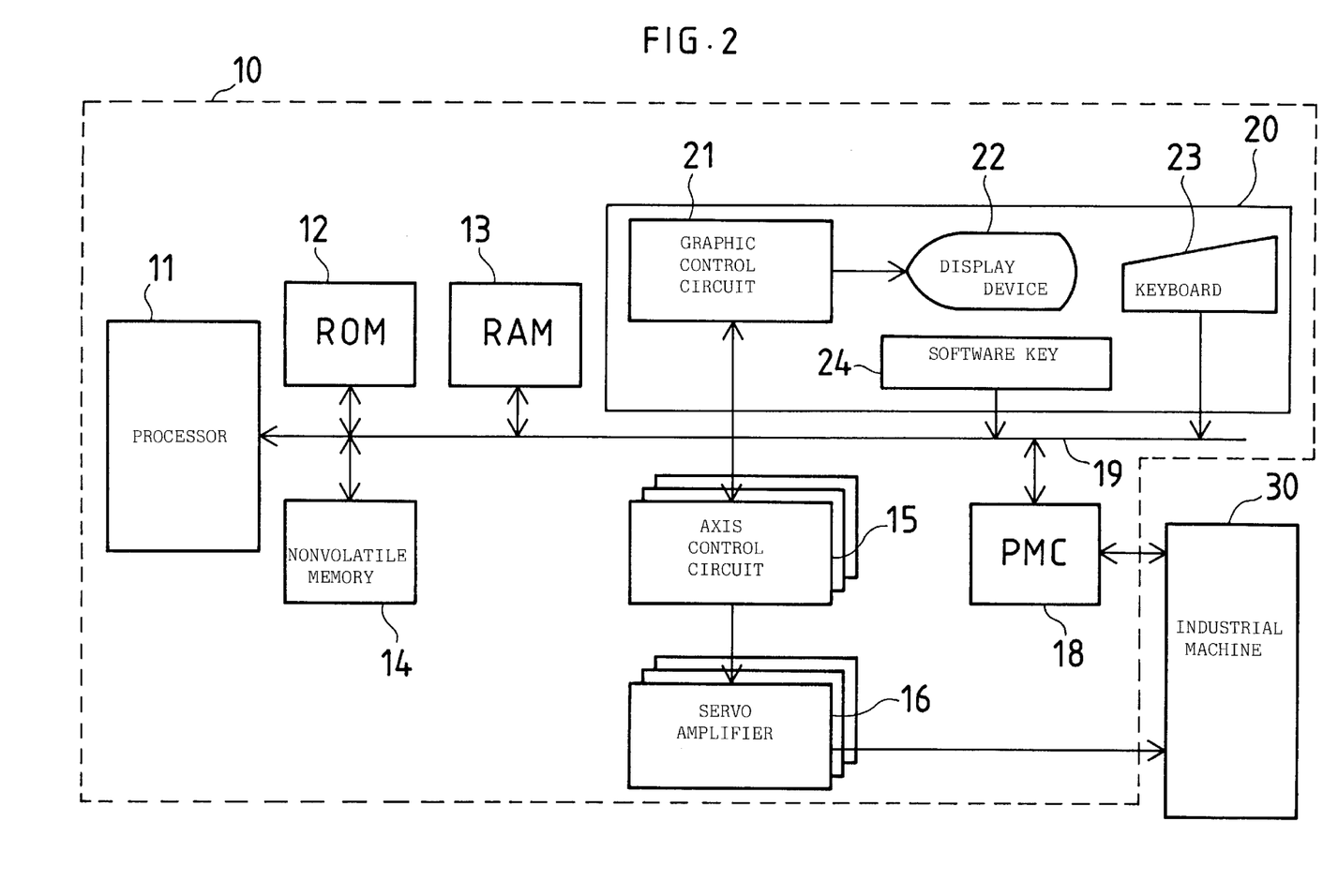
FIG. 2 is a block diagram showing an outline of the hardware of a CNC used in the acceleration-deceleration control apparatus according to the present invention.

Referring now to the block diagram of FIG. 2, described in the following is an outline of the arrangement of the hardware of a CNC for executing the acceleration-deceleration control.

A processor 11 of the CNC 10 controls the whole CNC in accordance with a system program stored in a ROM 12. An EPROM or EEPROM is used as this ROM 12. An SRAM or the like is used as a RAM 13, which is loaded with temporary computation data, display data, input and output signal states, etc. A CMOS backed up by a battery (not shown) is used as a nonvolatile memory 14, which stores parameters, command programs, etc. to be held after disconnection from the power supply.

A display unit with manual input means (CRT/MDI) 20 is located on the front face of the CNC or at the same position as a machine control panel, and is used for display of data and graphics, input of the data, and run of the CNC. A graphic control circuit 21 converts digital signals, such as numerical data, graphic data, etc., into raster signals for display, deliver them to a display device 22, whereupon the display device 22 displays these numerical values and graphics. A CRT or liquid crystal display device is used as the display device 22. A keyboard 23 is composed of numerical keys, symbolic keys, character keys, and function keys, and is used to create and edit instruction programs and run the CNC. Software keys 24 are arranged at the lower part of the display device 22, and their functions are displayed on the display device. As the function displayed on the display screen changes, the functions of the software keys also change corresponding to the displayed functions.

Axis control circuits 15 deliver move commands for axes to servo amplifiers 16 in response to axis move commands from the processor 11. The servo amplifiers 16 amplify these move commands, and actuate a servomotor that is coupled to an industrial machine 30. The axis control circuits 15 and the servo amplifiers 16 correspond in number to the axes of the servomotor.

A PMC (programmable machine controller) 18 receives M (auxiliary) function signals or the like from the processor 11 through a bus 19. Then, it processes these signals according to sequence programs and delivers output signals, thereby controlling a pneumatic apparatus, hydraulic apparatus, electromagnetic actuator, etc. in the industrial machine 30. On receiving button signals and switch signals from a machine control panel in the industrial machine 30 and signals from limit switches and the like, moreover, the PMC 18 carries out a sequence processing, and transfers necessary input signals to the processor 11 via the bus 19.

The following is a description of specific processes for the acceleration-deceleration control.

Figure 3:
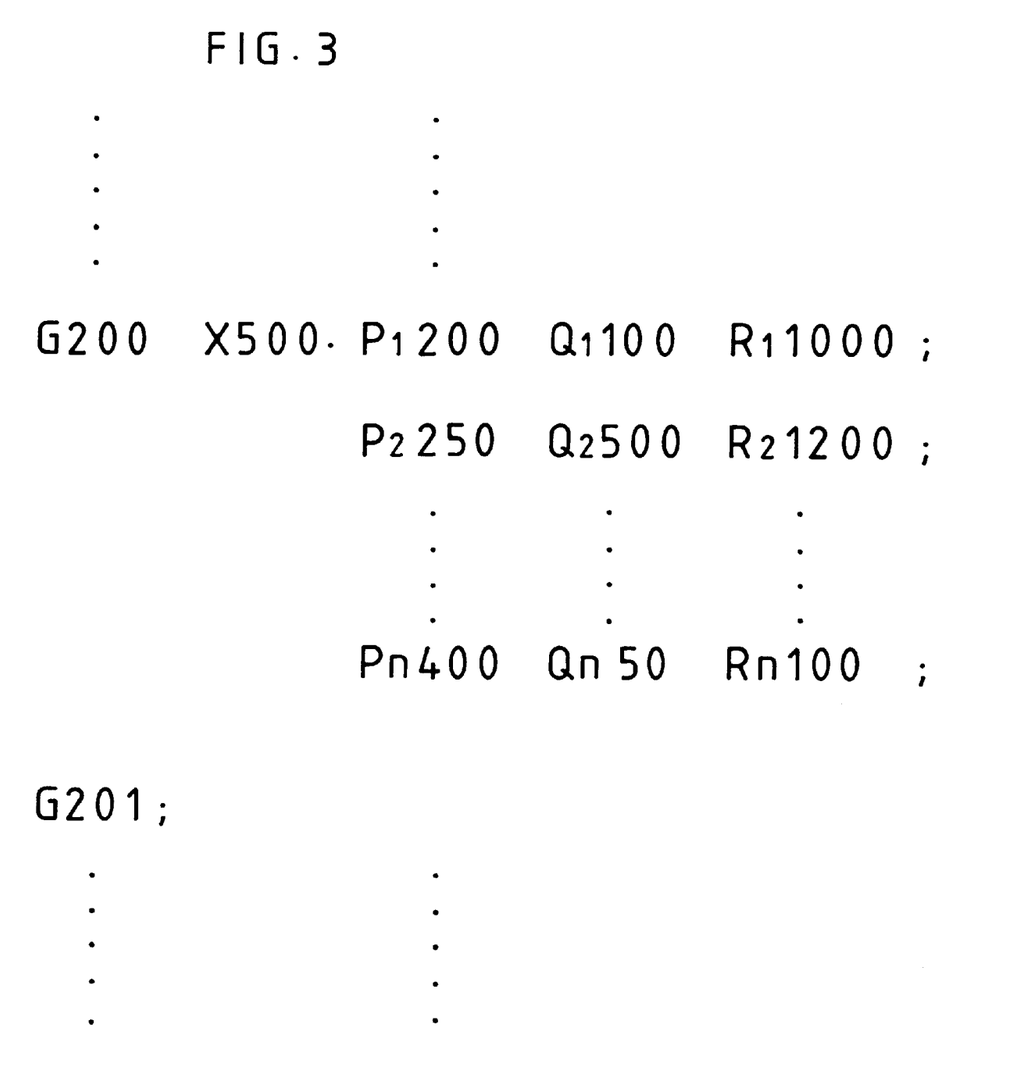
FIG. 3 is a diagram showing an example of a command program used in the acceleration-deceleration control apparatus according to the present invention.

FIG. 3 shows an example of a command program used in the acceleration-deceleration control. In this command program, a code G200 is a code that commands an acceleration-deceleration control execution mode, and X is a target position. Codes P1, P2 . . . , Pn are codes that command coordinate positions for the start of acceleration or deceleration of the servomotor. Codes Q1, Q2 . . . , Qn are codes that command time constants for acceleration or deceleration in the individual coordinate positions. Codes R1, R2 . . . Rn are codes that command target speeds after the acceleration or deceleration of the servomotor at the individual coordinate positions. A code G201 is a code that orders a termination of the acceleration-deceleration control execution mode.

An example of speed change based on the acceleration-deceleration control will now be described with reference to the graph of FIG. 4, in which the axes of abscissa and ordinate represent time t and servomotor speed F, respectively. According to FIG. 4, the speed change is made in the following manner. At the start of operation, the machine is accelerated with a time constant Q0 that is preset according to the command program concerned. When the current speed of the servomotor reaches a preset speed F0, this acceleration is finished, and the servomotor is driven at the constant speed F0 from that point on. The time constant Q0 and the speed F0 are initial set values.

When the servomotor is operated at the initial set value F0 until a first command position P1 commanded by the acceleration-deceleration control code G200 is reached, the machine is accelerated with a time constant Q1 from the position P1. When the current speed reaches R1, this acceleration is finished, and the servomotor is driven at the constant speed R1 from that point on. Then, when a second command position P2 is reached, the machine is decelerated with a time constant Q2 from the position P2. When the current speed reaches R2, this deceleration is finished, and the servomotor is driven at the constant speed R2 from that point on. Likewise, when a fourth commanded position P4 is reached, thereafter, the machine is decelerated with a time constant Q4 from the position P4. When the current speed reaches R4, this deceleration is finished, and the servomotor is driven at the constant speed R4 from that point on.

If the machine is then decelerated with the initially set time constant Q0, it decelerates with the time constant Q0 from a position that permits stoppage at the target position X, and stops at the target position X.

Figure 4:
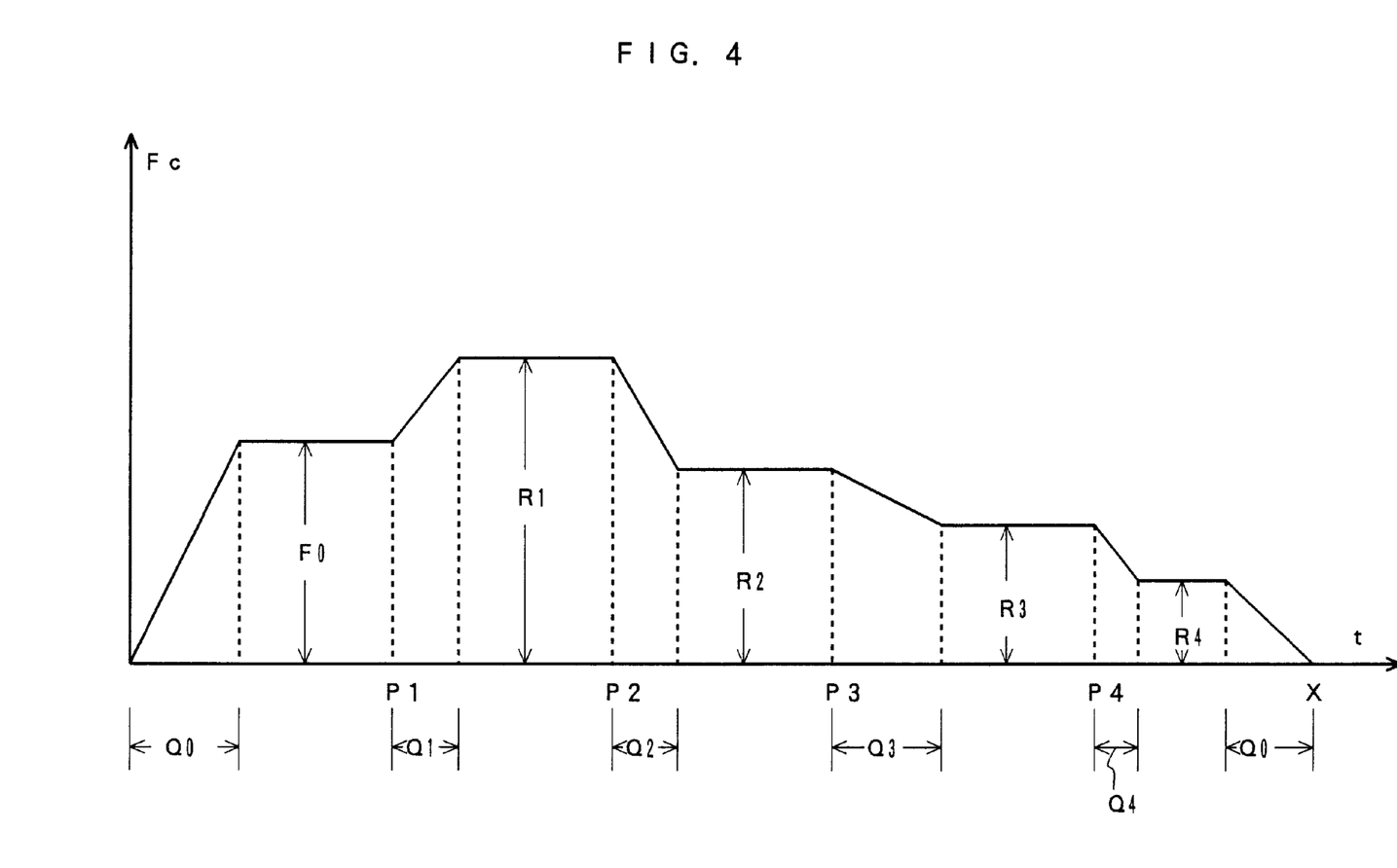
FIG. 4 is a time-speed graph showing an example of acceleration-deceleration control to be executed according to the present invention.

In order to execute acceleration-deceleration control in a manner shown in FIG. 4, data to be written in the command program, as shown in FIG. 3, include are of X; P1, Q1, R1; P2, Q2, R2; P3, Q3, R3; and P4, Q4, R4.

In the acceleration-deceleration control, the current position and current speed of the servomotor are internally recognized on the bases of command values. Alternatively, they may be made to be recognized on the bases of position feedback signals fed back from pulse coders or the like.

Figure 5:
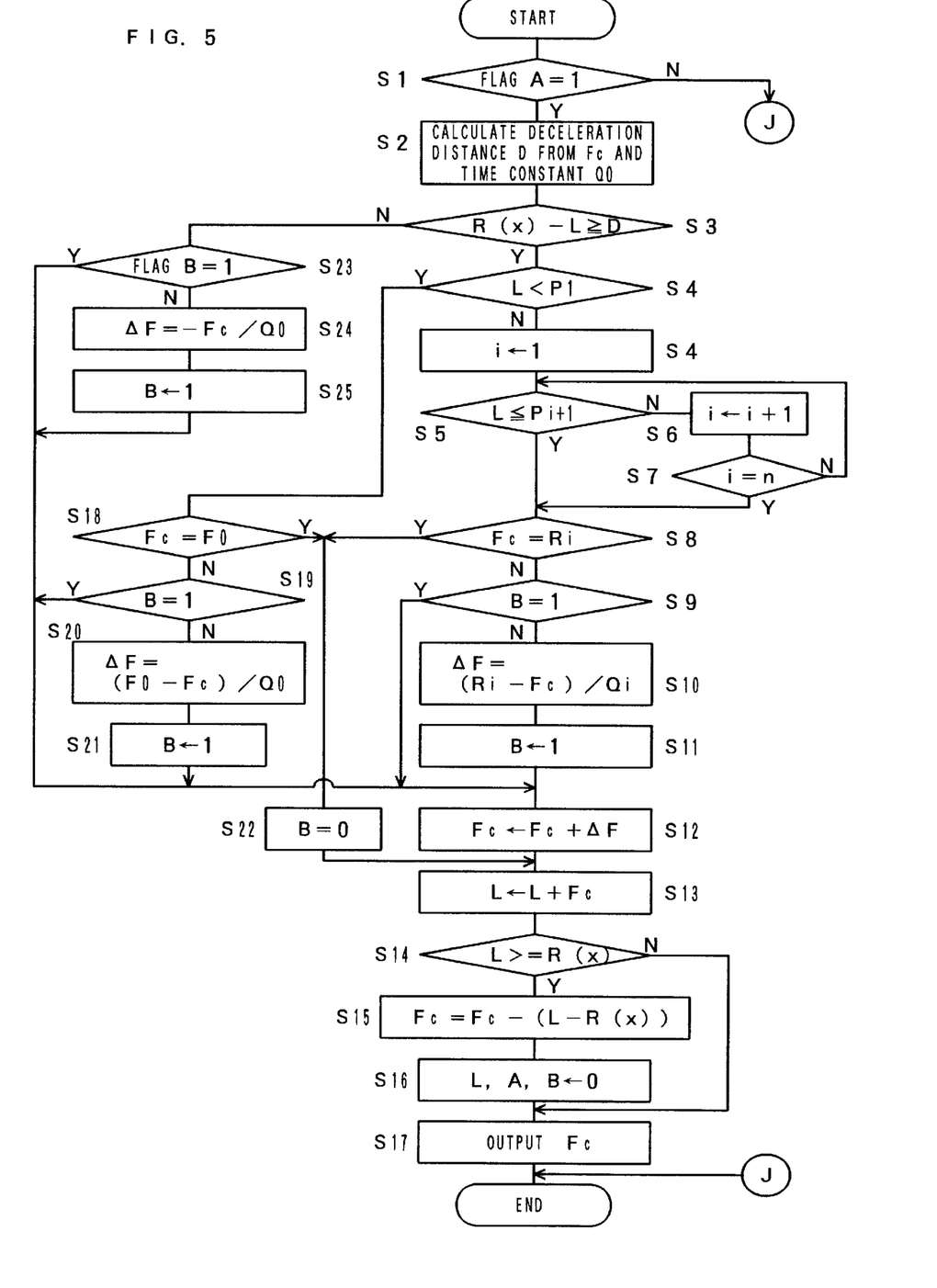
FIG. 5 is a flowchart of processing by program for the acceleration-deceleration control according to the present invention.

Referring now to the flowchart of FIG. 5, described is the procedures in which the processor 11 of the CNC executes the acceleration-deceleration control shown in FIG. 4 in accordance with the command program shown in FIG. 3. The processor 11 executes processes based on the flowchart of FIG. 5 with every distribution cycle.

When the processor 11 reads the G200 of the command program in a stage of preprocessing for originating execution data for distributing the move commands, it reads all the command values until it reads the next G201, and store them into predetermined regions of memories. More specifically, the value of the target position X is stored in a target position register R(x), and stores the values of P(P1, P2 . . . , Pn), Q(Q1, Q2, . . . , Qn), and R(R1, R2 . . . , Rn) in the predetermined regions of memories R(p), R(q) and R(r), respectively. Further, a flag A is set (=1), a flag B is reset (=0), and the value in a register for storing a movement L since the start of the acceleration-deceleration control mode is reset (=0), in advance. By this preprocessing, the time constant Q is converted into the number of distribution cycles and stored, while the target speed R is converted into an amount of movement for each distribution cycle and stored.

In a distribution cycle process, main processing is started after normal processing is carried out. The processor 11 first determines whether or not the flag A is set (Step S1). If the flag A is not set, it is concluded that the main processing is not a processing for acceleration-deceleration control, and the main processing is finished. On the other hand, if the flag A is set, a deceleration distance D (D=Q0×Fc/2) is first computed on the bases of a current commanded speed value Fc stored in a register and the preset time constant Q0 (Step S2), in order to start the acceleration-deceleration control process. Then, it is determined whether or not the remainder of movement calculated by subtracting the amount of movement L since the start of the acceleration-deceleration control mode from the value (X) stored in the target position register R(x) is greater than the deceleration distance D (Step S3). In other words, it is determined-whether or not the current amount of movement L corresponds to the position to start deceleration toward the target position X by the time constant Q0 (Step S3).

In a first cycle, the position (P4) for the start of the deceleration toward the target position X by the time constant Q0 cannot be reached yet, so that the conclusion in Step S4 is "YES." Then, it is determined whether or not the current amount of movement L has passed the position P1 for the first acceleration-deceleration control in accordance with the command program (Step S4). Since the position P1 is not passed yet in the first cycle, the conclusion in Step S4 is "YES," and it is then determined whether or not the preset initial speed F0 is reached by the current commanded speed value Fc (Step S18).

The conclusion in Step S18 is "NO" in those cycles, including the first cycle, in which the machine is accelerated toward the set speed F0. Then, it is determined whether or not the flag B is set at 1 (Step S19), Since the first cycle is started with the flag B reset (=0), the conclusion in Step S19 is "NO," so that a movement increment (speed increment) ΔF in the distribution cycle is obtained by dividing by the set time constant Q0 a value obtained by subtracting the current commanded speed value Fc (0 in the case of FIG. 4) from the target speed (=set speed F0) (Step S20). Then, the flag B is set (Step S21), and the increment ΔF is added to the value in the register in which the speed command value Fc is stored (Step S12). That is, the commanded value of speed (amount of movement commanded for the distribution cycle) Fc becomes 0+ΔF=ΔF in this cycle. Then, the amount of movement L stored in the register is increased by the amount equivalent to the present commanded speed Fc (move command value for the distribution cycle concerned) (Step S13), and it is confirmed that a value stored in the target position register R(x) is not exceeded by the updated amount of movement L (Step S14). Then, the current commanded speed value Fc (commanded value of movement for the present distribution cycle) is outputted as a move command to the axis control circuits for driving and controlling the servomotor (Step S17) to terminate the first cycle of processing.

If the set speed F0 has not been reached yet by the current commanded speed value Fc in the next (second) cycle, the processing advances to Steps S1 to S4 and to S18. Then, in Step S19, it is confirmed that the flag B is set. Since the flag B is already set in Step S21 in the first cycle, the current speed is increased by ΔF (Step S12). Thereafter, the program advances to Steps S13, S14 and S17 in like manner to terminate the processing in the present cycle.

A third processing cycle and subsequent ones are executed in succession, and the speed command is increased by ΔF for each cycle. When the current commanded speed value Fc attains the set speed F0 (Fc=F0), "YES" is given as the conclusion in Step S18 that follows Steps S1 to S4. Thereupon, the flag B is reset (Step S22), the amount of movement L stored in the register is increased by the amount equivalent to the present commanded speed value Fc (Step S13), and it is confirmed that the value stored in the target position register R(x) is not exceeded by the updated amount movement L (Step S14). Then, the current commanded speed value Fc is outputted as a move command to the axis control circuits for driving and controlling the servomotor (Step S17), whereupon the present cycle of processing terminates.

When the first deceleration starting position P1 commanded by the command program is reached while keeping the current commanded speed value Fc at the set speed F0, L<P1 ceases to hold true, and "NO" is given as the conclusion in Step S4 that follows Steps S1 to S3. Thereupon, an index i is set at 1 (Step S4), it is confirmed that the next deceleration starting point Pi+1 (=P2) is not reached yet by the amount of movement L (Step S5: Y), and moreover, it is confirmed that a command speed R1 (i=1) after deceleration, stored in a memory R, is not reached yet by the current commanded speed value Fc (Step S8: N). Thereafter, it is determined whether or not the flag B is set (=1) (Step S9). When constant-speed operation is started after the preceding acceleration-deceleration processing is finished, the flag B is already reset (=0) in Step S22 in a past processing cycle, so that the conclusion in Step S9 is "NO."

Thereupon, the commanded speed increment (commanded movement increment) ΔF for each distribution cycle is obtained by dividing, by a command time constant Qi (=Q1) stored in a register Q, a value obtained by subtracting the current commanded speed value Fc (=F0) from a command speed Ri (=R1) stored in the memory R(r) (Step S10). Then, the flag B is set (Step S11), the speed increment ΔF is added to the current commanded speed value Fc stored in the register (Step S12), and the value in the register storing the amount of movement L is increased by the amount equivalent to the present commanded speed value Fc (Step S13). After it is confirmed that the value stored in the target position register R(x) is not exceeded by the updated amount of movement L (Step S14), the current commanded speed value Fc is delivered as a move command to the axis control circuits for driving and controlling the servomotor (Step S17), whereupon the present cycle of processing terminates.

When the machine is in an acceleration stage with the time constant Q1 after the point P1 is passed by the amount of movement L (ΔF>0), "YES" is given as the conclusion in the process of Step S9 that follows Steps S1 to S5 and Step S8. This is because the flag B is already set in Step S11 in a past cycle. As a result, the speed increment ΔF (previously obtained in Step S10 in a past cycle) is added to the current commanded speed value Fc (Step S12), and the value in the register storing the amount of movement L is increased by an amount equivalent to the present speed command value Fc (Step S13). After it is confirmed that the value stored in the target position register R(x) is not exceeded by the updated amount of movement L (Step S14), the current commanded speed value Fc is delivered as a move command to the axis control circuits for driving and controlling the servomotor (Step S17), whereupon the present cycle of processing terminates.

As the acceleration processing by the time constant Q1 is continued until the current commanded speed value Fc becomes equal to the command value Ri (=R1) stored in the memory R(r) (Fc=R1), "YES" is given as the conclusion in the process of Step S8 that follows Steps S1 to S5. Thereupon, the flag B is reset (Step S22), the value in the register for storing the movement L is increased by an amount equivalent to the present speed command value Fc (Step S13), and it is confirmed that the value stored in the target position register R(x) is not exceeded by the updated movement L (Step S14). Thereafter, the current commanded speed value Fc is delivered as a move command to the axis control circuits for driving and controlling the servomotor (Step S17), whereupon the present cycle of processing terminates.

In this manner, the processings of Steps S1 to S5, S8, S22, S13, S14 and S17 are continued for each cycle. When the value in the register storing the amount of movement L at Step S14 starts to exceed the position of the point P2 (next deceleration starting position), L≦P2 will no longer holds. In the next cycle, therefore, "NO" is given as the conclusion in Step S5 that follows Steps S1 to S4. Thereupon, the index i, currently at 1, is further increased by 1 (Step S6) to i=2. After it is confirmed that the maximum number n of the index (n=4 in the case of FIG. 4) is not reached by the resulting index (Step S7: N), the program returns to Step S5, whereupon it is determined whether or not a point P3 (i+1=3) is reached by the amount of movement L. If the amount of movement L is short of the point P3 even after passing the point P2, L≦P3 still holds, so that the conclusion in Step S5 is "YES."

In a cycle in which deceleration by the command time constant Q2 is started with the amount movement L at the point P2, the processings of Steps S8, S12 to S14, and S17 are executed and finished. On the other hand, in a cycle in which the deceleration is in progress, the processings of Steps S8, S9, S12 to S14, and S17 are executed and finished. In a cycle in which the command speed R2 is reached, the processings of Steps S8, S22, S13, S14 and S17 are executed and finished.

When the value of the register storing the movement L exceeds P3 in a certain cycle, it is concluded that L≦P2 does not hold (N) in Step S5 that follows Steps S1 to S4 in the next cycle. Thereupon, the index i is increased by 1 to 2 (i=2) (Step S7). After confirming that the maximum value n (number of the points P is 4 in the case of FIG. 4) is not reached by the resulting value (Step S7: N), the program returns to Step S5, whereupon it is determined whether or not L≦P3 holds (Step S5). However, since the amount of movement L has already passed the point P3, the conclusion in Step S5 becomes N again, so that the index i is further increased by 1 to 3 (i=3) (Step S7). After it is confirmed that the maximum value n is not reached by the resulting value (Step S7: N), the program returns to Step S5, whereupon it is determined whether or not L≦P4 holds (Step S5). Since the amount of movement L is short of the point P4 even after passing the point P3, the conclusion in Step S5 is "YES" (with the value of the index i is 3), whereupon the process of Step S8 and the subsequent processes mentioned before are executed by using a time constant Q3 and a target speed R3.

When the value of the index i reaches the maximum value n in Step S6 that follows Steps S1 to S5, the process of Step S8 and the subsequent processes are executed by using a time constant Qn (=Q4) and a target speed Rn (=R4) with the index i at n (i=n).

Thus, when the value in the register storing the movement L, updated in Step S14, exceeds a value obtained by subtracting the deceleration distance D to the target position from the value stored in the target position register R(x), R(x)−L≧D ceases to hold, and "NO" is given as the conclusion in Step S3 that follows Steps S1 and S2 in the next cycle. Then, it is determined whether or not the flag B is set (Step S23). Since the flag B has been reset (=0) in Step S22 that follows Step S8 in a past cycle, "NO" is given as the conclusion in Step S23 when the program transfers for the first time from Step S3 to Step S23. As a result, the speed increment ΔF (minus value) for each distribution cycle is obtained by dividing the product of the current commanded speed value Fc (R4 in FIG. 4) and minus 1 by the set time constant Q0 (Step S24). Then, the flag B is set (=1) (Step S25), and deceleration processing is effected by adding the speed increment ΔF to the current commanded speed value Fc (Step S12). Thereafter, the processes of Steps S13, S14 and S17 are executed, whereupon the processing in the present cycle terminates.

In a processing cycle in which the machine is in a stage of deceleration toward the target position with the set time constant Q0, the conclusion in Step S23 that follows Steps S1 and S2 is "YES." This is because the flag B has already been in Step S25. As a result, deceleration processing is effected by adding the speed increment ΔF to the current speed. Thereafter, the processes of Steps S13, S14 and S17 are executed, whereupon the processing in the present cycle terminates.

Thus, when the value in the register storing the movement L is increased by an amount equivalent to the present speed command value Fc in the next step or Step S13 after the program has advanced to Steps S1 to S3, S23 and S12, the conclusion in Step S14 is "YES" if the value stored in the target position register R(x) is reached or exceeded by the updated movement L. Thereupon, the current commanded speed value Fc is modified by subtracting an excess (L−R(x)) of the updated movement over the value stored in the target position register R(x) from the current commanded speed value Fc computed in step 12 (that is, by computing Fc−(L−R(x)), the flags A and B are reset (=0), and the value in the register storing the movement L is reduced to zero. Thereafter, the modified current commanded speed value Fc is outputted, whereupon the processing in the final cycle is terminated.

As discussed above, according to the present invention, the acceleration or deceleration is executed with reference to the current position and current speed of the servomotor and based on the acceleration-deceleration points in one block commanded by the command program and the time constant and acceleration or deceleration speed corresponding to such acceleration-deceleration point. Accordingly, the acceleration or deceleration in one block can be executed without previously setting parameters or points of contact. Thus, excellent controllability, response and easy setting can be made available, thereby also enabling the operating efficiency to be improved. Besides, the timings and command programs for acceleration and deceleration can be rewritten, contributing to its greater general-purpose applicability.

We claim:

1. A CNC acceleration-deceleration control apparatus, comprising:

a program storage device storing a command program including a plurality of command blocks and an acceleration-deceleration starting position for each block which include an acceleration-deceleration starting position, a time constant for acceleration-deceleration control to be started at said acceleration-deceleration starting position, and a target speed to be attained by said acceleration or deceleration control;

a current position recognizing device recognizing the current position of a servomotor driving and controlling a machine;

a current speed recognizing device recognizing the current speed of said servomotor; and an acceleration-deceleration control device which executes said command blocks read from said program storage device, and when recognizing that the current position data received from said current position recognizing device has reached the acceleration-deceleration starting position set in one of the command blocks, starting an acceleration-deceleration operation for the servomotor with the time constant set in the command block, and when recognizing that the current speed data received from said current speed recognizing device has reached the target speed set in said one of the command blocks, completing said acceleration-deceleration operation such that the servomotor is kept driven at said target speed.

2. The CNC acceleration-deceleration control apparatus according to claim 1, wherein said industrial machine is a belt conveyor.

3. The CNC acceleration-deceleration control apparatus comprising:

a program storage device storing a command program including a plurality of blocks and an acceleration-deceleration starting position for each block, a time constant for acceleration-deceleration control to be started at said acceleration-deceleration starting position, and a target speed to be attained by acceleration or deceleration;

a current position recognizing device recognizing the current position of a servomotor driving and controlling an industrial machine;

a current speed recognizing device recognizing the current speed of said servomotor; and an acceleration-deceleration control device executing the acceleration-deceleration control based on the time constant corresponding to the starting position stored in said command program with reference to the current position and current speed of said servomotor, wherein the time constant for the acceleration-deceleration control accompanying the start of the operation thereof and the speed for the period up to a first acceleration-deceleration point commanded by the command program after the acceleration with said time constant are previously set in a CNC.

4. A CNC acceleration-deceleration control method, comprising the steps of:

controlling a servomotor with a command program having a plurality of blocks, each block including a move target position, at least one acceleration-deceleration starting position, a time constant for acceleration-deceleration control to be started at each acceleration-deceleration starting position, and a target speed for the acceleration-deceleration control;

carrying out the acceleration-deceleration control with an acceleration-deceleration time constant corresponding to each acceleration-deceleration starting position assigned by said command program, when it is detected that the current position of said servomotor arrives at the acceleration-deceleration starting position; and terminating the acceleration-deceleration control started at said acceleration-deceleration starting position when it is detected that the target speed, corresponding to said acceleration-deceleration starting position, is attained by the current speed of said servomotor as a result of the acceleration-deceleration control, wherein said acceleration-deceleration control is made either by adding the same speed increment to or subtracting the same speed decrement from the current speed at every predetermined period.

5. A computer-readable medium having stored thereon a plurality of sequences of instructions, said plurality of sequences of instructions including sequences of instructions which, when executed by a processor, causing said processor to perform the steps of:

storing a command program containing an acceleration-deceleration starting position for each block, a time constant for acceleration-deceleration control to be started at said acceleration starting position, and a target speed to be attained by acceleration or deceleration;

recognizing the current position of a servomotor for driving and controlling an industrial machine and the current speed of said servomotor; and executing the acceleration-deceleration control based on said command program with reference to the current position and current speed of said servomotor, wherein the time constant for the acceleration of said industrial machine accompanying the start of the operation thereof, and the speed for the period up to a first acceleration-deceleration point commanded by the command program after the acceleration with said time constant are previously set in a CNC.

6. A computer-readable medium having stored thereon a plurality of sequences of instructions, said plurality of sequences of instructions including sequences of instructions which, when executed by a processor, causing said processor to perform the steps of:

storing a command program containing an acceleration-deceleration starting position for each block, a time constant for acceleration-deceleration control to be started at said acceleration starting position, and a target speed to be attained by acceleration or deceleration;

recognizing the current position of a servomotor for driving and controlling an industrial machine and the current speed of said servomotor; and executing the acceleration-deceleration control based on said command program with reference to the current position and current speed of said servomotor, wherein the acceleration-deceleration control is made either by adding the same speed increment to or subtracting the same speed decrement from the current speed at every predetermined position.

* * * * *